United States Patent
Friedlander et al.

(10) Patent No.: US 9,389,410 B2
(45) Date of Patent: Jul. 12, 2016

(54) FACILITATING THE MORE NATURAL AIMING OF TELESCOPES

(75) Inventors: Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 2309 days.

(21) Appl. No.: 12/344,742

(22) Filed: Dec. 29, 2008

(65) Prior Publication Data

US 2010/0165457 A1    Jul. 1, 2010

(51) Int. Cl.
   G06F 15/00    (2006.01)
   G06F 15/18    (2006.01)
   G02B 23/00    (2006.01)

(52) U.S. Cl.
   CPC ............... *G02B 23/00* (2013.01); *G06F 15/00* (2013.01)

(58) Field of Classification Search
   CPC .......... G02B 23/00; G06F 15/00; G05F 15/18
   USPC ........................................................ 359/430
   See application file for complete search history.

(56) References Cited

U.S. PATENT DOCUMENTS

| | | | |
|---|---|---|---|
| 7,382,448 B1 * | 6/2008 | Hedrick et al. | 356/139.01 |
| 7,382,533 B1 * | 6/2008 | Peters, Jr. | 359/430 |
| 2006/0103926 A1 * | 5/2006 | Meyers et al. | 359/430 |
| 2008/0018995 A1 * | 1/2008 | Baun | 359/399 |

OTHER PUBLICATIONS

Azimuth <http://en.wikipedia.org/wiki/Azimuth>.*
'History of the telescope': [retrieved on Aug. 2, 2012], Retrieved from the Internet <URL:http://en.wikipedia.org/wiki/History_of_the_telescope>.*
'The History of the Telescope': King, 1955, Charles Griffin & Co., p. 36.*

* cited by examiner

*Primary Examiner* — Peter Coughlan
(74) *Attorney, Agent, or Firm* — Yee & Assocates, P.C.; Maeve Carpenter

(57) ABSTRACT

The illustrative embodiments provide for a computer implemented method, computer readable medium, and data processing system for adjusting a perceived image seen through an optical observation device. The azimuth-elevation-rotation of the optical observation device is measured relative to an observer. The field of view observed through the observation device appears with at least one of rotated and inverted optical translation relative to observation of the object with an unaided eye of the observer. Based on the celestial coordinate system inherent in the design of the mounting of the optical observation device, moving optical observation device in the optical translation direction, wherein the field of view moves in the optical view direction, and wherein the celestial coordinate system is selected from a group consisting of an equatorial coordinate system and an azimuth-elevation coordinate system.

20 Claims, 4 Drawing Sheets

FIG. 1
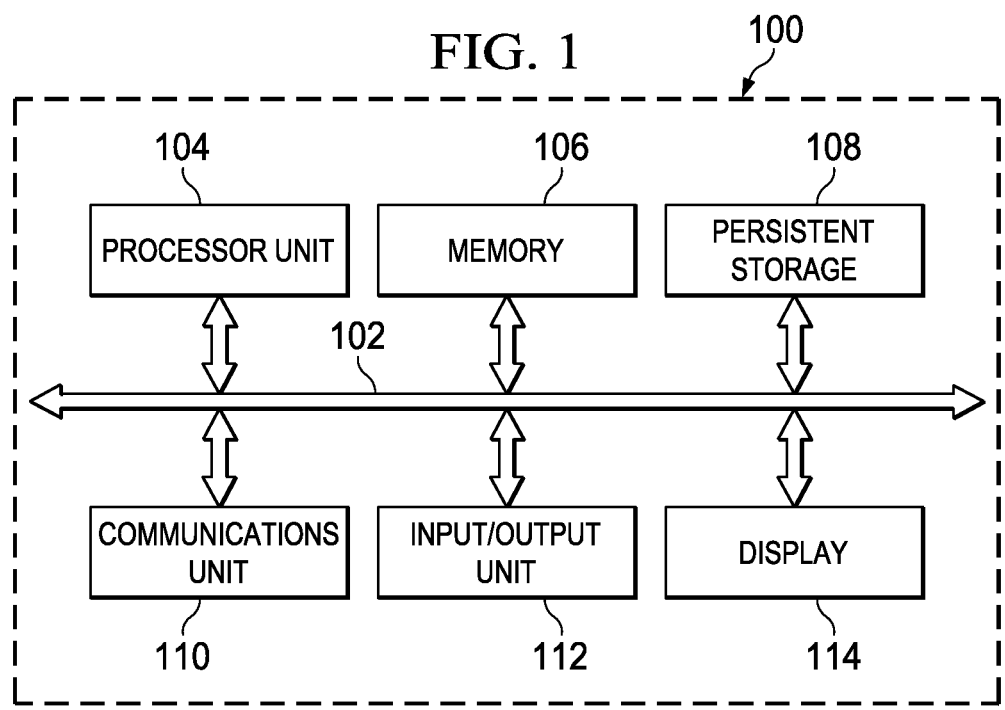
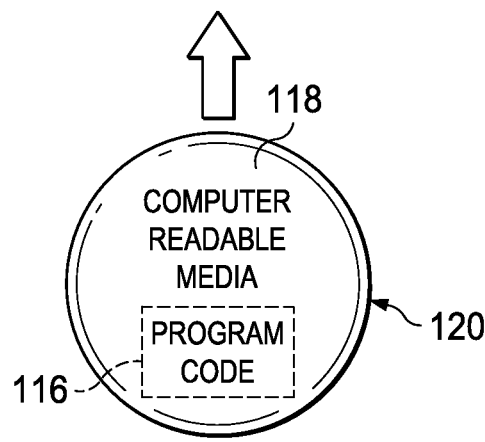

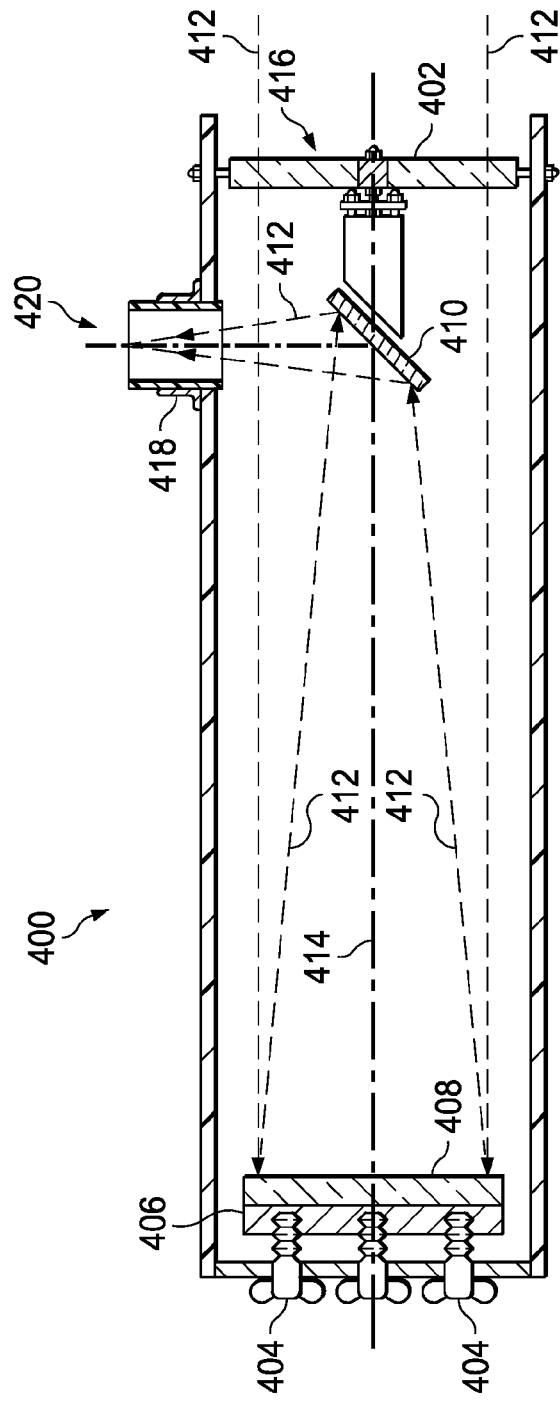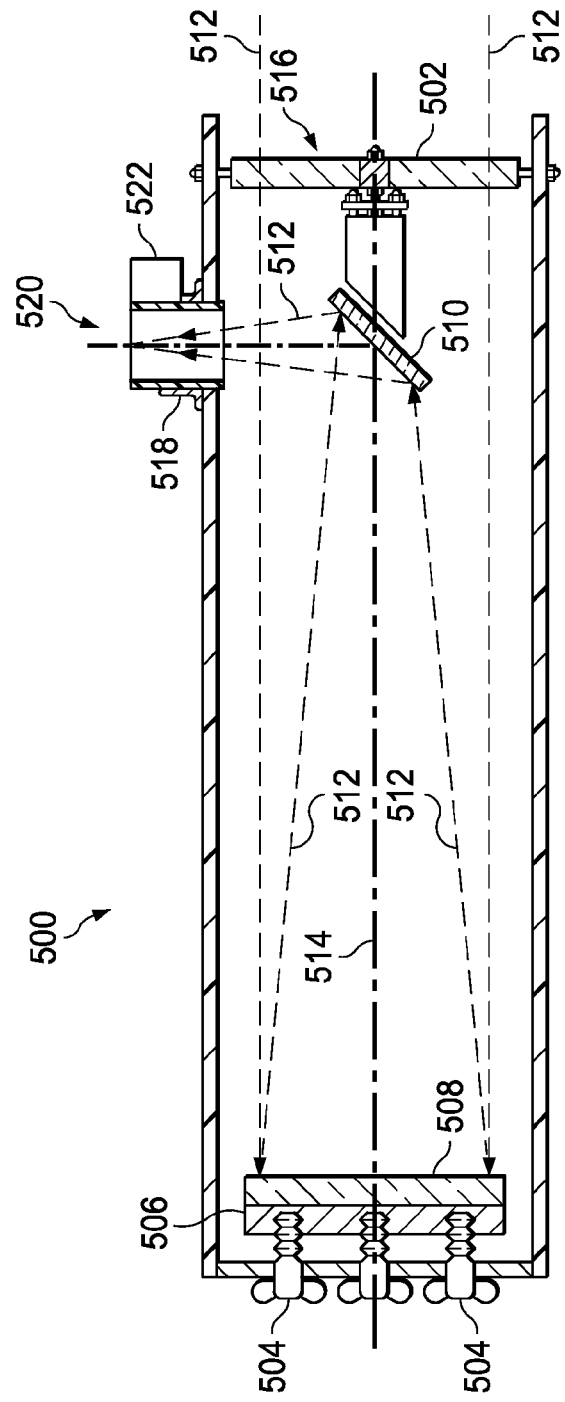

FACILITATING THE MORE NATURAL AIMING OF TELESCOPES

BACKGROUND OF THE INVENTION

1. Field of the Invention

The present invention relates generally to astronomy and more specifically to the improved aiming of telescopes.

2. Description of the Related Art

Telescopes can be difficult to aim without sophisticated tracking hardware and software. There exist fully automated telescope aiming systems. These systems align a telescope to the celestial coordinate system. Then, the telescopes receive and input of coordinates for an object the user wishes to track. Once the object is identified and the telescope is positioned on the object, the telescope will track the object without further input from the user.

Another feature of the aiming systems is to use directional buttons to move the telescope along the axis of right ascension and declination of the equatorial coordinate system. This way of aiming of telescopes can be particularly difficult because the optics of a telescope or telescope finder can skew or even invert the image of the object of interest observed through the telescope so it takes a lot of mental concentration for the user to grasp which way the user needs to move the telescope to achieve the direction the user wishes to optically move. This difficulty can be frustrating for casual telescope users and even some amateur telescope users. Therefore, it would be useful to have a way of aiming a telescope that removed the hassle of figuring out which way to physically move the telescope to achieve the desired optical movement.

BRIEF SUMMARY OF THE INVENTION

The illustrative embodiments provide for a computer implemented method, computer readable medium, and data processing system for adjusting a perceived image seen through an optical observation device. The azimuth-elevation-rotation of the optical observation device is measured relative to an observer. The field of view observed through the observation device appears with at least one of rotated and inverted optical translation relative to observation of the object with an unaided eye of the observer. Based on the celestial coordinate system inherent in the design of the mounting of the optical observation device, moving optical observation device in the optical translation direction, wherein the field of view moves in the optical view direction, and wherein the celestial coordinate system is selected from a group consisting of an equatorial coordinate system and an azimuth-elevation coordinate system.

BRIEF DESCRIPTION OF THE SEVERAL VIEWS OF THE DRAWINGS

FIG. 1 is a diagram of a data processing system, in accordance with an illustrative embodiment;

FIG. 4 is an illustration of a telescope, in accordance with an illustrative embodiment;

FIG. 5 is an illustration of a telescope upon which is mounted an accelerometer, in accordance with an illustrative embodiment.

DETAILED DESCRIPTION OF THE INVENTION

Figure 2:
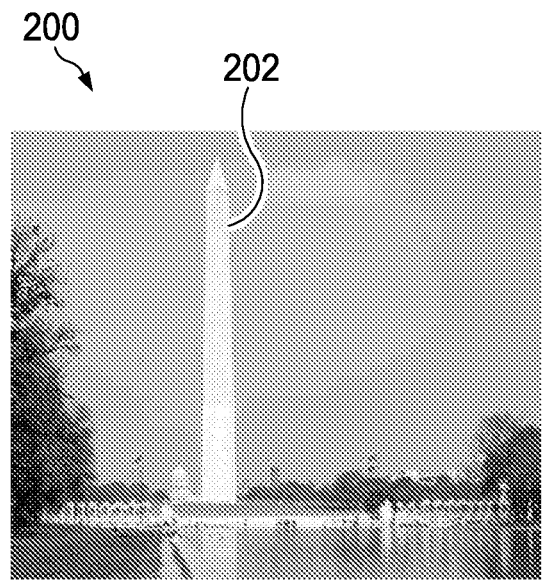
FIG. 2 is a view of an object perceived by a naked eye, in accordance with an illustrative embodiment.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communication links or wireless transmissions containing the program code.

In some illustrative embodiments, program code 116 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 116 may be a server computer, a client computer, or some other device capable of storing and transmitting program code 116.

The different components illustrated for data processing system 100 are not meant to provide architectural limitations to the manner in which different embodiments may be implemented. The different illustrative embodiments may be implemented in a data processing system including components in addition to, or in place of, those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

The illustrative embodiments provide for a computer implemented method, computer readable medium, and data processing system for adjusting a perceived image seen through an optical observation device. The azimuth-elevation-rotation of the optical observation device is measured relative to an observer. The field of view observed through the observation device appears with at least one of rotated and inverted optical translation relative to observation of the object with an unaided eye of the observer. Based on the celestial coordinate system inherent in the design of the mounting of the optical observation device, moving optical observation device in the optical translation direction, wherein the field of view moves in the optical view direction, and wherein the celestial coordinate system is selected from a group consisting of an equatorial coordinate system and an azimuth-elevation coordinate system.

FIG. 2 is a view of an object perceived by a naked eye, in accordance with an illustrative embodiment. View 200 includes object 202, which in this case is a monument.

Figure 3:
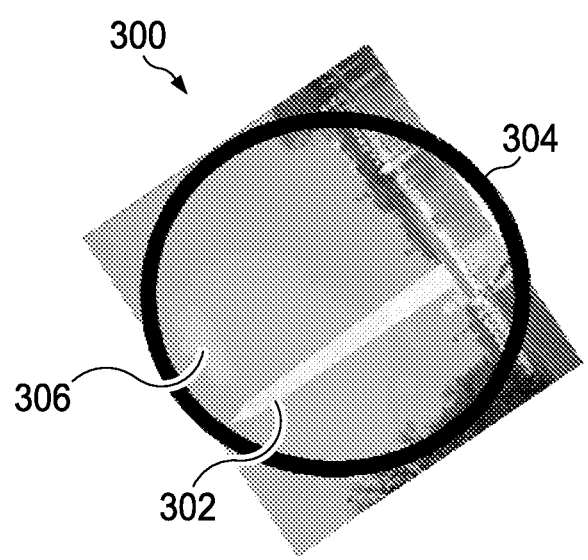
FIG. 3 is a view of the object in FIG. 2 as perceived through a finder eyepiece or a telescope, in accordance with an illustrative embodiment.

FIG. 3 is a view of the object in FIG. 2 as perceived through a finder eyepiece or a telescope, in accordance with an illustrative embodiment. Thus, in view 300, object 302 is the same as object 202. However, object 302 is seen through the eyepiece or main viewer of a telescope, as shown by circle 304. The area contained within circle 304 is field of view 306. As shown in FIG. 3, field of view 306 and object 302 are perceived as being rotated by an angle. In other telescopes, field of view 306 and object 302 may also appear inverted. This rotation or inversion can make pointing the telescope more difficult than pointing the telescope where view 300 is not rotated or inverted.

FIG. 4 is an illustration of a telescope, in accordance with an illustrative embodiment. View 300 shown in FIG. 3 may be a view perceived through telescope 400. Telescope 400 may be controlled by software implemented on a data processing system, such as data processing system 100 in FIG. 1, wherein the software controls mechanical motors or rotors that control the direction in which the telescope is pointed. Telescope 400 is a reflecting telescope. Many other types of telescopes exist, and the inventive methods described herein can be applied to all of them, if desired.

Telescope 400 collects light through opening 402. Collimation screws 404 through the back of the telescope hold mirror cell 406 and primary mirror 408 in place within telescope 400. Light passes through opening 402 and is focused by mirror cell 406 and primary mirror 408, onto secondary mirror 410. Arrows 412 show the path of the light rays that enter telescope 400. As can be seen, secondary mirror 410 is located along the light cone centerline 414, which is the tube centerline. Spider assembly 416 is connected to the walls of telescope 400. Spider assembly 416 allows light to pass into the telescope, though spider assembly 416 also serves as a mount for secondary mirror 410.

Eventually, light reflected by the various mirrors in telescope 400 passes into focuser 418 to focal point 420. An observer can then put his eye next to focuser 418 and view the enlarged image of whatever object telescope 400 is pointed. However, as shown in FIG. 3, the image may be rotated or inverted.

In more detail, telescope 400 can be referred-to as a Newtonian telescope. In a Newtonian telescope, as described above, an image may be rotated, inverted, or reversed depending on the direction of the object and the orientation of the telescope tube and eyepiece. These image translations occur due to secondary mirror 410 that reflects the image out the side of the telescope tube. Any optical system that has one or more mirrors or prisms may suffer from similar problems.

Other telescopes, such as Schmidt-Newtonian telescopes, and some telescopes with ninety or forty-five star diagonals or prisms can create similar optical translations. If the eyepiece is in a position other than vertical or horizontal, the optical translations will cause the optical image to appear at an angle. These optical translations cause telescope pointing difficulties that are particularly present in equatorial mount telescope mounts such as a German equatorial mount (GEM) telescope mount. A GEM telescope is oriented to rotate on the same axis as the rotational plane of the earth. Pointing of GEM telescopes is done relative to the celestial equator of the earth rather than the simple up and down, right and left movement of an azimuth-elevation telescope mount.

Thus, devices and methods are needed for measuring the position and inclination of the eyepiece to compensate for an unusual orientation, inversion or rotation of the telescope pathway. Once the compensated movement direction is calculated, the telescope may be moved in a physical direction such that the movement of the observed image will appear as if the observer were observing the object normally with the naked eye.

FIG. 5 is an illustration of a telescope upon which is mounted an accelerometer, in accordance with an illustrative embodiment. The telescope 500 shown in FIG. 5 is the same telescope 400 shown in FIG. 4. Thus, reference numerals in FIG. 5 refer to the same objects as those presented in FIG. 4.

However, attached to telescope 500 is accelerometer 522. Accelerometer 522 can be used to measure the position and inclination of the eyepiece and/or telescope to compensate for an inversion or rotation of the telescope optical pathway. Preferably, accelerometer 522 is attached to focuser 518, though accelerometer 522 could be attached to any portion of telescope 500. An exemplary accelerometer could be a three-dimensional accelerometer, such as the ADXL330 from Analog Devices, LIS3LV02DQ accelerometer from ST Micro, or the MMA7260Q accelerometer from Freescale.

Accelerometer 522 provides azimuth, elevation, and rotation inputs to a control program that can calculate the optical translation of the image presented to the observer at the eyepiece. Specifically, accelerometer 522 can be used to calculate the values for moving the right ascension and declination of telescope 500. Right ascension is the angle around the equator in hours, degrees, minutes, and seconds. One complete revolution is 24 hours. Declination is the angle from the celestial equator to the poles. The equator is 0 degrees and the north pole is 90 degrees.

The conversion to and from equatorial measurements to azimuth-altitude (Az-Alt) coordinates are trigonometric computations. Let "d" be the declination and "H" be the hour angle. Let "p" be the observer's latitude. Let "Alt" be the altitude and "Az" be the azimuth. Let "T" be the zenith angle (or Zenith distance, i.e., the 90 degree component of "Alt.") For these variables, the equations of transformation are as follows:

$$\sin(Alt) = \cos(T) = \sin(p)*\sin(d) + \cos(p)*\cos(d)*\cos(H); \text{ and} \quad 1)$$

$$\cos(Az) = [\cos(p)*\sin(d) - \sin(p)*\cos(d)*\cos(H)]/\cos(Alt). \quad 2)$$

Using these equations, the desired transformations can be made, and the optical translations caused by eyepiece, telescope, prisms, or internal mirrors can be compensated for during physical movements to render the view of the image perceived by the observer through focuser 518 as if the observer would see the observed object with the naked eye.

Although the illustrative embodiments described above use an accelerometer to measure the desired values, other devices can also be used to measure the desired values. For example, cantilevers can measure angles, as can angular scales, optical measuring tools, or many other different types of methods for measuring angles or changes in angles.

In an illustrative embodiment, these transformations could be used to enhance one-handed, multiple speed telescope controllers. This illustrative embodiment, described further below, can also utilize TrackPoint produced by International Business Machines Corporation of Armonk, N.Y.

Several commercially available telescopes, such as those available from Meade or Celestron, have hand controllers that allow a user to automatically control a telescope. First, a number is pressed on a controller to set a speed of movement of the telescope. Then, one of four arrow keys is pushed to indicate the movement in declination or right ascension.

TrackPoint inputs would allow direction and speed inputs with a single motion based on the data calculated according to formulas 1) and 2) presented above. The directions can be for any angle, not just for the four cardinal directions. By using a series of small steps in two cardinal directions, any angle can be produced. For large movements, movement can be rapid initially, and then slow as the final target is approached. Thus, using the illustrative embodiments, the observer can move telescope 400 in any direction at any desired speed, with one hand while never taking an eye away from the eyepiece.

Figure 6:
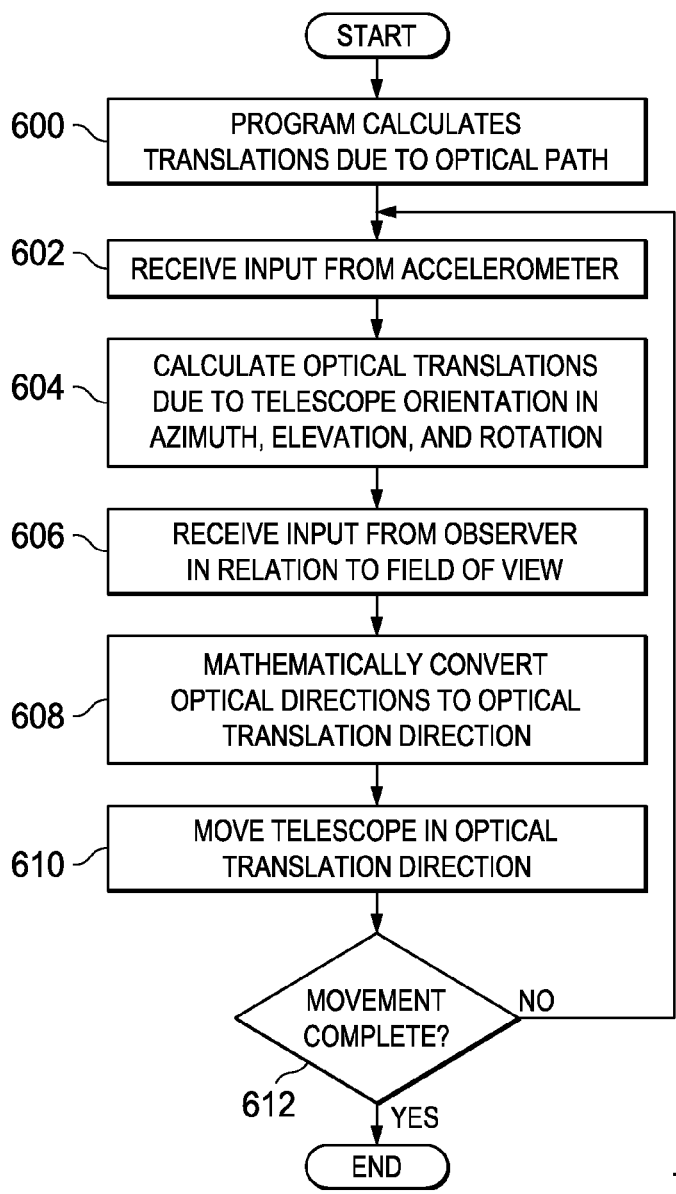
FIG. 6 is a flowchart of a process for implementing translation of apparent direction in an eyepiece of a telescope or viewfinder to physical movements of the telescope, in accordance with an illustrative embodiment.

FIG. 6 is a flowchart of a process for implementing translation of apparent direction in an eyepiece of a telescope or viewfinder to physical movements of the telescope, in accordance with an illustrative embodiment. The process described with respect to FIG. 6 can be implemented using software implemented on a data processing system, such as such as data processing system 100 in FIG. 1. The process described with respect to FIG. 6 can be used to implement the techniques described with respect to FIG. 4 and FIG. 5. The data processing system that implements the method shown in FIG. 6 can be located on the telescope itself, or could be located remotely and be in communication with a controller on the telescope.

The process begins as a software program calculates translations due to optical paths (step 600). The process and equations are described above with respect to FIG. 5. Next the program receives input from the accelerometer (step 602). The program then calculates optical translations due to telescope orientation in azimuth, elevation, and rotation (step 604).

If desired, the program can then receive input from the observer in relation to the field of view from a manual controller (step 606). The input can be in the form of a direction. This direction can be the optical view direction. The optical view direction can be the direction the user wishes to move the field of view relative to the view. For example, if a user is looking at the base of a tree and wishes to look at the top of the tree, the user would input into the telescope to move up. The optical view direction would be up. However, the telescope may not physically up. The telescope would move in the optical translation direction which can be in another direction.

The program then mathematically converts the optical view direction to an optical translation direction (step 608). The optical translation direction can be calculated based on the celestial coordinate system used. The celestial coordinate system used can be inherent in the design of the mounting of the telescope. The optical translation direction can be the physical direction that the telescope moves. For example, if the coordinate system used is an equatorial coordinate system, the optical translation direction would be along the right ascension and declination axis.

The telescope is then moved in the optical translation direction (step 610). As a result, the observer sees the field of view moving in the optical direction as if the observer were looking at the observed object with the naked eye.

The program then evaluates whether movement is complete (step 612). If movement of the telescope is not complete, (a "no" result to step 612), then the process returns to step 602 and repeats. Otherwise, (a "yes" result to step 612), the process terminates.

Figure 7:
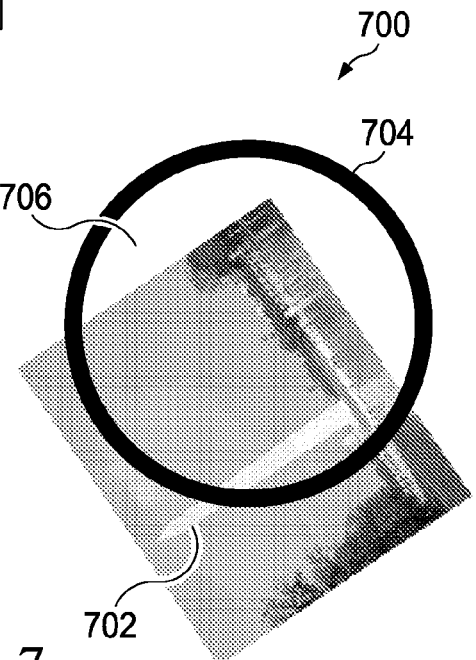
FIG. 7 is a view of the object in FIG. 2 as perceived through a finder eyepiece or a telescope, in accordance with an illustrative embodiment.

FIG. 7 is a view of the object in FIG. 2 as perceived through a finder eyepiece or a telescope, in accordance with an illustrative embodiment. However, this view 700 is after an input has been received to move the optical view direction up. Thus, in view 700, object 702 is the same as object 202 in FIG. 2. However, object 702 is seen through the eyepiece or main viewer of a telescope, as shown by circle 704. The area contained within circle 704 is field of view 706. As shown in FIG. 7, field of view 706 and object 702 are perceived as being rotated by an angle. In other telescopes, field of view 706 and object 702 may also appear inverted. In this illustrative embodiment, field of view 706 is the view within circle 704 immediately following a reception of an input from the user to move the view within circle 704 up. However, the telescope may have physically been moved in a different direction based on an optical translation direction.

The illustrative embodiments described above have been described with respect to a telescope. However, the illustrative embodiments can also be implemented with other optical devices that change or invert an image. For example, the illustrative embodiments can be implemented with respect to different kinds of telescopes, binoculars that somehow adjust an image, microscopes, or many other optical observation devices.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for facilitating the more natural aiming of an optical observation device, the computer implemented method comprising:
    measuring an azimuth of the optical observation device, an elevation of the optical observation device, and a rotation of the optical observation device relative to an observer, wherein a field of view observed through a focuser of the observation device appears with an optical translation relative to an observation of the field of view with an unaided eye of the observer;
    receiving input from the observer to move the field of view in an optical view direction; wherein the optical view direction is relative to the field of view;
    converting the optical view direction to an optical translation direction, wherein the optical translation direction is calculated based on a celestial coordinate system, and wherein the celestial coordinate system is inherent in a design of a mounting of the optical observation device; and
    moving the optical observation device in the optical translation direction, wherein the field of view moves in the optical view direction, wherein the optical translation is a rotation or an inversion of an optical pathway as seen by the observer through the focuser of the optical observation device, wherein the rotation or inversion is caused by an eyepiece, a prism, or an internal mirror in the optical observation device during a physical movement of the optical observation device, and wherein the rotation or inversion is compensated for during the physical movement so that the view perceived by the unaided eye of the observer through the focuser of the optical observation device appears in an orientation as though seen by the unaided eye of the observer.

2. The computer implemented method of claim 1 wherein the optical translation is selected from the group consisting of rotation and inversion.

3. The computer implemented method of claim 1 wherein the celestial coordinate system is selected from a group consisting of an equatorial coordinate system and an azimuth-elevation coordinate system.

4. The computer implemented method of claim 1 wherein the optical observation device comprises a telescope.

5. The computer implemented method of claim 4 wherein the telescope comprises a Newtonian telescope.

6. The computer implemented method of claim 4 wherein the telescope comprises one or more mirrors, prisms, lenses, or other device causing an optical translation of the image.

7. The computer implemented method of claim 4 wherein the telescope further comprises a hand controller for controlling movement of the telescope, and wherein direction and speed inputs for the telescope are input with a single motion.

8. The computer implemented method of claim 1 wherein measuring is accomplished using an accelerometer.

9. A non-transitory computer readable medium storing a computer program product for implementing a computer implemented method for facilitating the more natural aiming of an optical observation device, the computer implemented method comprising:

measuring an azimuth of the optical observation device, an elevation of the optical observation device, and a rotation of the optical observation device relative to an observer, wherein a field of view observed through a focuser of the observation device appears with an optical translation relative to an observation of the field of view with an unaided eye of the observer;

receiving input from the observer to move the field of view in an optical view direction;

wherein the optical view direction is relative to the field of view;

converting the optical view direction to an optical translation direction, wherein the optical translation direction is calculated based on a celestial coordinate system, and wherein the celestial coordinate system is inherent in a design of a mounting of the optical observation device; and moving the optical observation device in the optical translation direction, wherein the field of view moves in the optical view direction, wherein the optical translation is a rotation or an inversion of an optical pathway as seen by the observer through the focuser of the optical observation device, wherein the rotation or inversion is caused by an eyepiece, a prism, or an internal mirror in the optical observation device during a physical movement of the optical observation device, and wherein the rotation or inversion is compensated for during the physical movement so that the view perceived by the unaided eye of the observer through the focuser of the optical observation device appears in an orientation as though seen by the unaided eye of the observer.

10. The computer readable medium of claim 9 wherein the optical observation device comprises a telescope.

11. The computer readable medium of claim 10 wherein the telescope comprises a Newtonian telescope.

12. The computer readable medium of claim 10 wherein the telescope comprises one or more mirrors, prisms, lenses, or other device causing an optical translation of the image.

13. The computer readable medium of claim 10 wherein the telescope further comprises a hand controller for controlling movement of the telescope, and wherein direction and speed inputs for the telescope are input with a single motion.

14. The computer readable medium of claim 9 wherein measuring is accomplished using an accelerometer.

15. A data processing system comprising:

a bus;

a processor connected to the bus;

a memory connected to the bus, wherein the memory stores computer readable instructions which, when executed by the processor, implements a computer implemented method of for facilitating the more natural aiming of an optical observation device, the computer implemented method comprising:

measuring an azimuth of the optical observation device, an elevation of the optical observation device, and a rotation of the optical observation device relative to an observer, wherein a field of view observed through a focuser of the observation device appears with an optical translation relative to an observation of the field of view with an unaided eye of the observer;

receiving input from the observer to move the field of view in an optical view direction; wherein the optical view direction is relative to the field of view;

converting the optical view direction to an optical translation direction, wherein the optical translation direction is calculated based on a celestial coordinate system, and wherein the celestial coordinate system is inherent in a design of a mounting of the optical observation device; and moving the optical observation device in the optical translation direction, wherein the field of view moves in the optical view direction, wherein the optical translation is a rotation or an inversion of an optical pathway as seen by the observer through the focuser of the optical observation device, wherein the rotation or inversion is caused by an eyepiece, a prism, or an internal mirror in the optical observation device during a physical movement of the optical observation device, and wherein the rotation or inversion is compensated for during the physical movement so that the view perceived by the unaided eye of the observer through the focuser of the optical observation device appears in an orientation as though seen by the unaided eye of the observer.

16. The data processing system of claim 15 wherein the optical observation device comprises a telescope.

17. The data processing system of claim 16 wherein the telescope comprises a Newtonian telescope.

18. The data processing system of claim 16 wherein the telescope comprises one or more mirrors, prisms, lenses, or other device causing an optical translation of the image.

19. The data processing system of claim 16 wherein the telescope further comprises a hand controller for controlling movement of the telescope, and wherein direction and speed inputs for the telescope are input with a single motion.

20. The data processing system of claim 15 wherein measuring is accomplished using an accelerometer.

* * * * *